United States Patent [19]

Koskinas

[11] Patent Number: 5,755,427
[45] Date of Patent: May 26, 1998

[54] SELF ADJUSTING BALL VALVE ASSEMBLY

[75] Inventor: John Koskinas, Kennesaw, Ga.

[73] Assignee: NAF AB, Linkoping, Sweden

[21] Appl. No.: 606,070

[22] Filed: Feb. 23, 1996

Related U.S. Application Data

[60] Provisional application No. 60/003,367 Sep. 7, 1995.
[51] Int. Cl.$^6$ ............................................... F16K 5/20
[52] U.S. Cl. ................................. 251/188; 251/163
[58] Field of Search ................................. 251/188, 163

[56] References Cited

U.S. PATENT DOCUMENTS

| | | | |
|---|---|---|---|
| 2,655,942 | 10/1953 | Dougherty | 251/163 |
| 3,456,916 | 7/1969 | Ytzen et al. | 251/309 |
| 3,749,358 | 7/1973 | Bates | 251/298 |
| 3,902,694 | 9/1975 | Friedell | 251/163 X |
| 4,164,343 | 8/1979 | Graebner | 251/315 |
| 4,509,718 | 4/1985 | Bormioli | 251/163 |
| 4,632,140 | 12/1986 | Harding | 137/315 |
| 4,634,098 | 1/1987 | Varden | 251/188 |
| 5,170,992 | 12/1992 | Lenberg | 251/304 |
| 5,186,433 | 2/1993 | Pausch | 251/309 |

FOREIGN PATENT DOCUMENTS

| | | |
|---|---|---|
| 0 069 491 | 1/1983 | European Pat. Off. . |
| 657 137 | 2/1938 | Germany . |
| 1433887 | 7/1976 | United Kingdom . |

*Primary Examiner*—John Fox
*Attorney, Agent, or Firm*—Lahive & Cockfield, LLP

[57] ABSTRACT

A self adjusting ball valve assembly having a ball valve body, a shaft assembly or shaft mounted to the ball valve body, a spherical segment carried by the shaft, and elements for adjusting the position of the shaft. The ball valve body has a port for fluid transit therethrough and a first through passage, located concentrically about a body axis. The shaft rotatably mounts through the first through passage along a shaft axis, which is maintained parallel but offset from the body axis. The spherical segment mounts to the shaft and radially extends from the shaft axis within the ball valve body, and includes a portion for sealing engagement with the port, upon rotation of the shaft through a predefined angle. The adjustment elements automatically adjust the offset between the body axis and the shaft axis to enhance the sealing engagement between the spherical segment and the port. A drive unit coupled to the shaft carriage reactively translates the shaft as the ball segment rotates enhancing seating of the valve and reducing the load on wear surfaces during valve operation. The segment is keyed to the shaft with dowel pins, and the shaft itself may be locked against rotation with pins that are selectively moved into cross-apertures. A shear coupling prevents damage to the shaft or drive unit when the shaft is locked.

33 Claims, 11 Drawing Sheets

FIG. 8
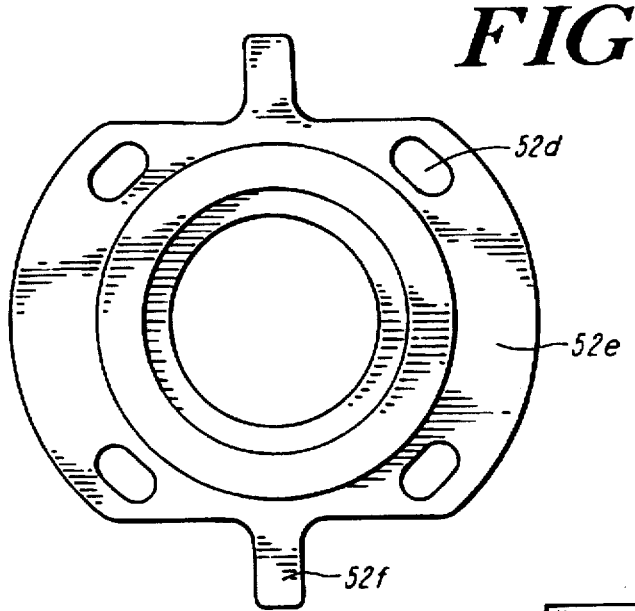
FIG. 9
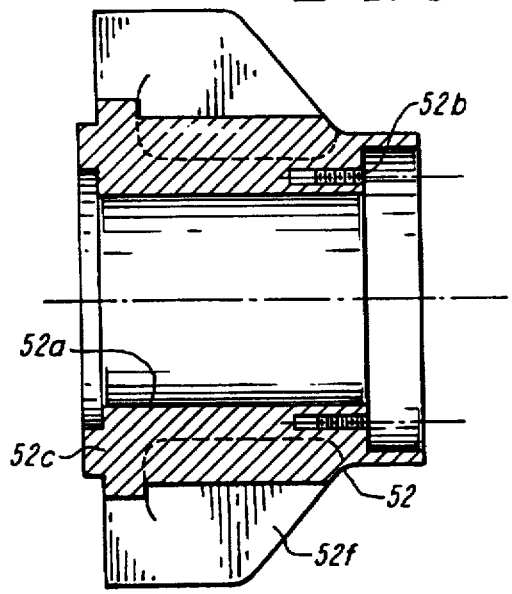
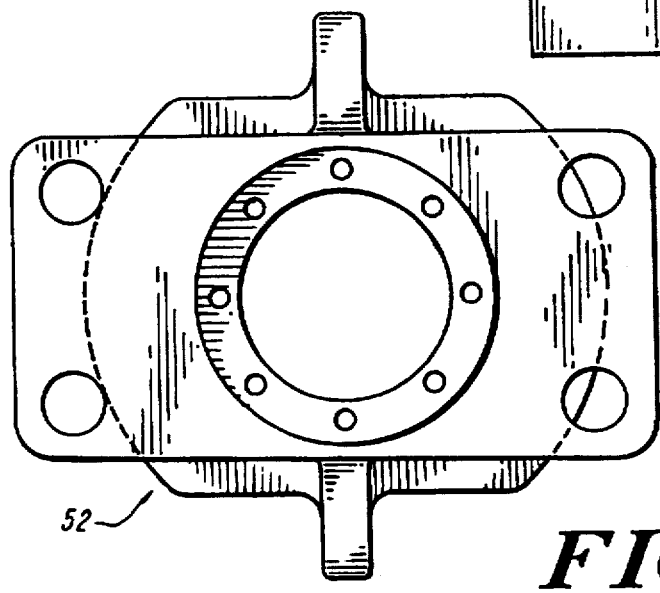
FIG. 10

SELF ADJUSTING BALL VALVE ASSEMBLY

RELATED APPLICATION

This is a continuation-in-part of applicant's United States Provisional Patent application Ser. No. 60/003,367 filed on Sep. 7, 1995 and entitled BALL VALVE STRUCTURE WITH COMPENSATION.

BACKGROUND OF THE INVENTION

The present invention relates to a high pressure flow control valve of the ball valve type. More specifically the present invention relates to a ball valve assembly having an eccentrically mounted spherical segment for closing a passage and interrupting flow between an inlet port and an outlet port.

Ball valves have been used for many years for controlling high pressure flow. One field where they have proven to be quite useful is in the manufacture of paper. Typically, ball valves include a valve body, having an inlet port and an outlet port, and a sealing member mounted to a rotatable shaft within a substantially spherical inner chamber of the valve body. The outlet ports typically include a valve seat for sealing engagement with the sealing member. In some instances, both the inlet and outlet ports include valve seats. The sealing member can be a sphere, concentrically mounted to the rotatable shaft and having an axial substantially cylindrical through passage. Alternatively, the sealing member can be a spherical segment mounted to the shaft and radially extending from a shaft axis. In operation, a drive mechanism actuates the shaft to rotate the sphere or spherical segment between an open position and a closed position. In the closed position, an outer wall of the sphere or spherical segment engages and seals against the valve seat to inhibit flow between the inlet and outlet ports. In the open position, in the case of the sealing member being a sphere, the cylindrical through passage of the sphere is brought into axial alignment with the inlet and outlet ports to enable flow between those ports. In the case of the sealing member being a spherical segment, the outer surface of the spherical segment is disengaged and rotated away from the valve seat to enable unimpeded flow between the inlet and outlet ports.

In some conventional ball valves, the rotatable shaft mounts to the ball valve body so that the substantially spherical inner chamber of the valve body is concentric about the shaft axis. As a result, when the shaft rotates between open and closed positions, the outer surface of the sphere or spherical segment rubs against the valve seat. Such rubbing causes the valve seat and/or the outer surface of the sealing member to become worn. Once the valve seat or the sealing member becomes worn, the ball valve can no longer sufficiently inhibit flow between the inlet and outlet ports. Thus, such prior art valves require monitoring to ensure proper sealing operation, and from time to time require worn components, such as the valve seat or sealing member, to be replaced.

Some ball valves address this problem by mounting the rotatable shaft along a shaft axis eccentric with respect to the substantially spherical inner chamber of the ball valve body. With the rotatable shaft so mounted, the sealing member travels in a progressive arc between the open and closed positions, i.e., translates radially away from the valve seat as it rotates. Accordingly, as the valve is opened, the sealing member moves out of engagement with the valve seat. Such arcuate travel reduces the rubbing between the valve seat and the sealing member, and thus, reduces the wear on those components. However, this type of valve suffers from a significant drawback. That is, to achieve complete closure, the valve components related to sealing must be fabricated to fine tolerances. Those fine tolerances render the valve components expensive and difficult to mass produce. Additionally, while wear on the valve seat is reduced, it is not altogether eliminated. Consequently, this type of ball valve still requires the valve seat and/or the sealing member to be monitored and periodically replaced.

To avoid periodic part replacement, some ball valves incorporate an eccentricity adjustment. Typically, the eccentricity adjustment employs a rotatable eccentric bearing, which mounts the rotatable shaft to the valve body. When the valve seat becomes worn, the eccentric bearing can be rotated and affixed in its new position to change the eccentric offset between the rotatable shaft axis and a central axis of the substantially spherical inner chamber of the valve body. Adjusting the eccentric offset, while the valve is in the closed position, alters the arcuate travel of the sealing member, and brings the sealing member into sealing engagement with the valve seat. Such valves reduce the need for manufacturing close tolerance components and thereby, provide ball valves that are more easily mass produced. Nevertheless, these valves also suffer from significant drawbacks. One such drawback is that they must be monitored for wear and manually adjusted to ensure appropriate sealing. Another drawback, common to many prior art ball valves, is that they fail to exploit the ball valve ratio to enhance sealing capability.

The ball valve ratio is the ratio of the surface area of the sealing member to surface area of the valve seat. When in the closed position, pressure exerted by fluid on the inner (concave) surface of the sealing member operates in proportion to the ball valve ratio to increase the effectiveness of seal between the sealing member and the valve seat at the outlet port. The larger the ball valve ratio, the greater the effect on the seal. However, when in a closed position, the sealing member of prior art valves is typically mounted in a fixed radial position relative to the rotatable shaft. Thus, pressure exerted on the underside of the sealing member is effectively resisted by the bending strength of the shaft, and this pressure cannot significantly change the position of the sealing member, and therefore, as wear on the sealing faces increases, cannot significantly improve the sealing engagement between the sealing member and the valve seat.

Accordingly, an object of the present invention is to provide a ball valve having reduced need for close tolerance components.

Another object of the present invention is to provide a ball valve having reduced operational wear between the sealing member and the valve seat.

A further object of the invention is to provide a ball valve that self-adjusts automatically to compensate for wear between the sealing member and the valve seat.

An additional object of the invention is to provide a ball valve that exploits the ball valve ratio to improve the seal between the sealing member and the valve seat.

Other general and specific objects of the invention will in part be obvious and will in part appear hereinafter.

SUMMARY OF THE INVENTION

A ball valve assembly according to the invention attains the foregoing objects and other features of the invention with a self-adjusting loading of a sphere or spherical segment to enhance sealing engagement of the sphere or spherical segment with a valve seat. According to one embodiment, the invention attains this automatic self-adjustment with an active bearing mechanism that automatically adjusts a bearing which supports a shaft concentrically mounted to the sphere or spherical segment. The adjustment of the bearing changes an offset of the shaft relative to the valve body.

More specifically, according to one preferred embodiment of the invention, the ball valve assembly has a ball valve body which serves as a housing, a shaft, a spherical segment carried by the shaft, and elements for adjusting the position of the shaft. The ball valve body has first and second ports for fluid travel therebetween, along with a first substantially cylindrical through passage, located concentrically about a body axis. The shaft is rotatably positioned in the first through passage along a shaft axis, wherein the shaft axis is parallel to but offset from the body axis. The spherical segment mounts to the shaft and radially extends from the shaft axis within the ball valve body, and includes a portion for sealing engagement with the first port, upon rotation of the shaft through a predefined angle. The adjustment elements automatically vary the position of the shaft mounting to adjust the offset between the body axis and the shaft axis and enhance the sealing engagement between the spherical segment and the first port.

According to a further embodiment of the invention, the ball valve assembly includes a bearing for rotatably mounting the shaft within the first through passage. Preferably, the bearing is a sleeve bearing having a substantially cylindrical inner surface and a substantially cylindrical outer surface. A portion of the cylindrical outer surface fits concentrically within the first through passage and the cylindrical inner surface concentrically fits around a portion of the shaft. Thus, the inner surface of the sleeve bearing is eccentric relative to the outer surface of the sleeve bearing. Sealing elements, preferably deformable o-rings, form a fluid sealing barrier between the inner surface of the sleeve bearing and the shaft, and between the outer surface of the sleeve bearing and the first through passage of the ball valve body. Additionally, the cylindrical inner surface of the sleeve bearing has a friction reducing coating for facilitating rotation of the shaft within the bearing. According to a further embodiment of the invention, the sleeve bearing includes an external portion extending outward from the valve body.

The adjustment elements can include biasing elements for exerting a rotational bias on the sleeve bearing. With the inner surface of the sleeve bearing being eccentric relative to the outer surface, as the biasing elements rotate the sleeve bearing, the position of the shaft changes relative to the body axis, thus, changing the offset between the body axis and the shaft axis. Such offset adjustment provides an automatic compensation of fluid sealing engagement between the spherical segment and the first port. The rotational bias can be substantially constant or in the alternative, can be selectively applied.

In a further embodiment of the invention, the ball valve assembly includes a hub assembly having a substantially cylindrical through passage for concentrically fitting around the external portion of the sleeve bearing. The hub assembly has fastening elements for rotationally fixing the hub assembly with respect to the sleeve bearing, and mounting elements for rotationally adjustably mounting the hub assembly to the valve body. In other words, the hub assembly can rotate relative to the valve body. But, as the hub assembly rotates, the sleeve bearing rotates with it. Accordingly, the biasing elements can be configured to exert a rotational bias on the hub assembly to adjust the offset between the shaft axis and the body axis.

The biasing elements preferably include first and second resilient elements, which mechanically couple to the valve body and the hub assembly, and apply tangential forces on the hub assembly at first and second locations, respectively, to exert the rotational bias on the hub assembly. The first and second locations can be, for example, diametrically opposed along a periphery of the hub assembly. According to one embodiment, the resilient elements each include a shaft element and a piston element. The shaft element mechanically couples to the hub assembly at either the first or second location, and the piston element mechanically couples to the valve body. The piston element includes an actuator for exerting an axially directed force on the shaft element. The actuator can be, for example, a spring, a hydraulically actuated cylinder or a pneumatically actuated cylinder.

The ball valve assembly can also include elements for setting a rotational range in which the hub assembly can rotate in response to the biasing elements. More specifically, the ball valve assembly can include a collar radially disposed about the first through passage and extending axially outward from the valve body along the body axis. The mounting collar has a radially extending flange, with a first plurality of mounting apertures. The mounting elements of the hub assembly can be a second plurality of mounting apertures. Each of the first plurality of mounting apertures align with one of the second plurality of mounting apertures to form an aligned pair. Threaded fasteners extend through the aligned pairs to secure the hub assembly to the mounting collar. Preferably, the second plurality of mounting apertures of the hub assembly are slotted, and the sizing of the slots sets the rotational range through which the hub assembly can rotate. According to a further embodiment, a roller bearing, located at an interface between the hub assembly and the mounting collar, facilitates rotation of the hub assembly in relation to the mounting collar.

The mounting collar can include one or more radially disposed slots, each for receiving a corresponding radial tab located on the hub assembly. The slots and the tabs are sized to enable to the hub assembly to rotate about the body axis relative to the mounting collar, within the limits set by the slotted mounting apertures of the hub assembly. The mounting collar preferably also includes adjustable stops located within each of the radially disposed stops for selectively engaging the tabs on the hub assembly to limit the arc through which the hub assembly can rotate.

In another embodiment of the invention, the ball valve assembly employs a unique assembly for mounting the spherical segment to the rotatable shaft. The mounting assembly includes a mounting member having a first end for coupling to the spherical segment and a second end distal from the first end for coupling to a terminal end of the shaft. The second end has a substantially cylindrical through aperture for receiving the terminal end of the shaft. The mounting assembly also includes a fastening mechanism for fastening the terminal end of the shaft in the cylindrical through aperture of the mounting member. Preferably, the fastening mechanism includes a plurality of axially extending apertures formed in the terminal end of the shaft and in the second end of the mounting member, circumferentially spaced apart at an interface between the terminal end of the shaft and the cylindrical through aperture of the mounting member. Each of a plurality of dowel pins seat in one of the axially extending apertures located at the interface between the shaft and the cylindrical through aperture of the mounting member to inhibit the shaft from rotating within the cylindrical through aperture. A retaining plate fastens to either the mounting member or the terminal end of the shaft and inhibits the dowel pins from becoming unseated.

In a further embodiment of the invention, the ball valve assembly includes locking elements for locking the spherical segment in sealing engagement with the first port. Preferably, the locking elements include one or more radially extending apertures in the shaft and an interlock pin for selectively engaging one or more of the radially extending apertures to inhibit rotation of the shaft. The ball valve assembly can also include actuating elements for automatically actuating the interlock pin. Preferably, the interlock pin is spring loaded and it engages one of the radially extending apertures in the shaft in response to the shaft being in a particular rotational position. In one preferred embodiment, the ball valve assembly includes a drive element for rotating the shaft. The drive element is coupled to the shaft by way of a shear element. The shear element can decouple the drive element from the shaft at a lower torque than that which is required for the interlock pin to fail. Thus, the valve cannot be opened if the interlock pin is in place, even if the drive motor is inadvertently engaged.

BRIEF DESCRIPTION OF THE DRAWINGS

For a fuller understanding of the nature and objects of the invention, reference is to be made to the following detailed description and the accompanying drawings, in which:

FIGS. 8, 9 and 10 show three views of a shaft hub for the ball valve assembly of FIGS. 1-3;

DESCRIPTION OF ILLUSTRATED EMBODIMENT

The present invention is directed to a ball valve assembly in which the sphere or spherical segment is self-adjusting to enhance the sealing engagement of the sphere or spherical segment with a valve seat.

Figure 1A:
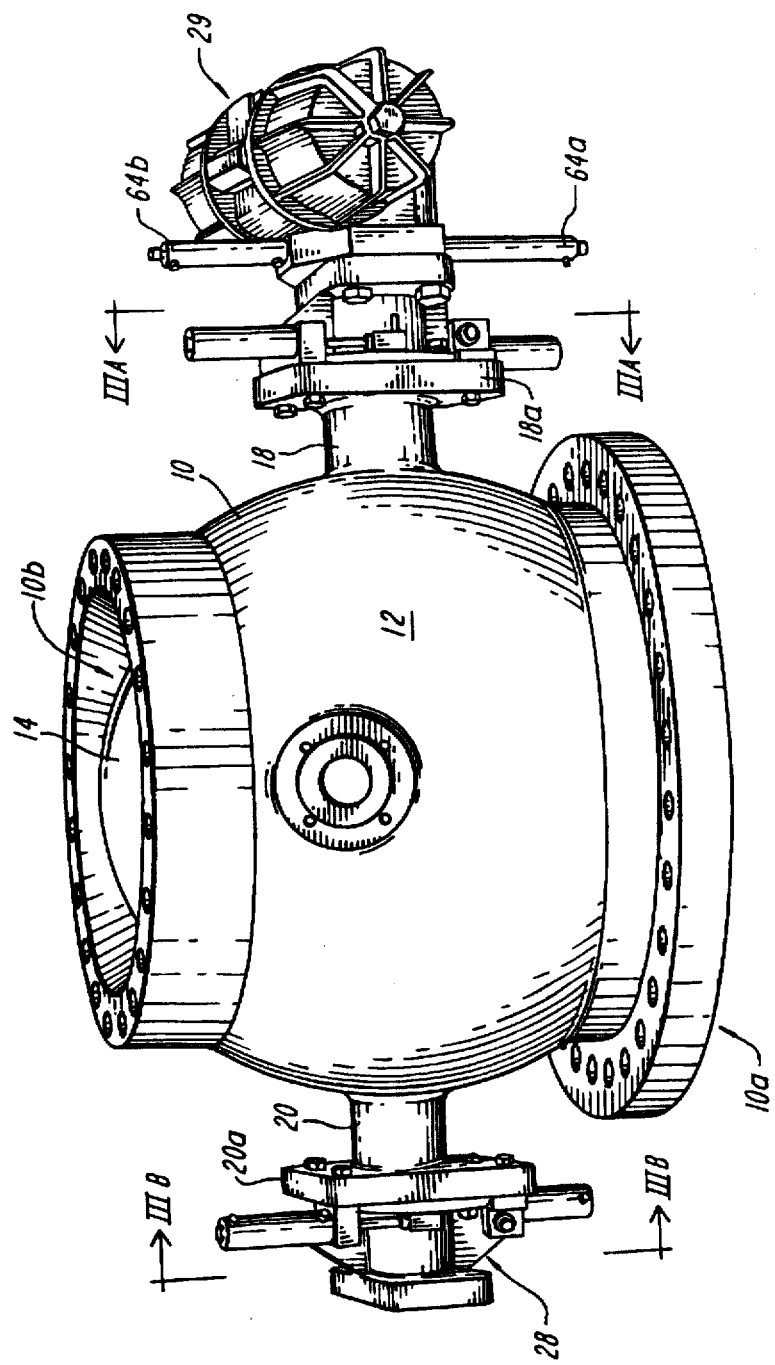
FIGS. 1A and 1B are views of a ball valve assembly according to one embodiment of the invention.
Figure 1B:
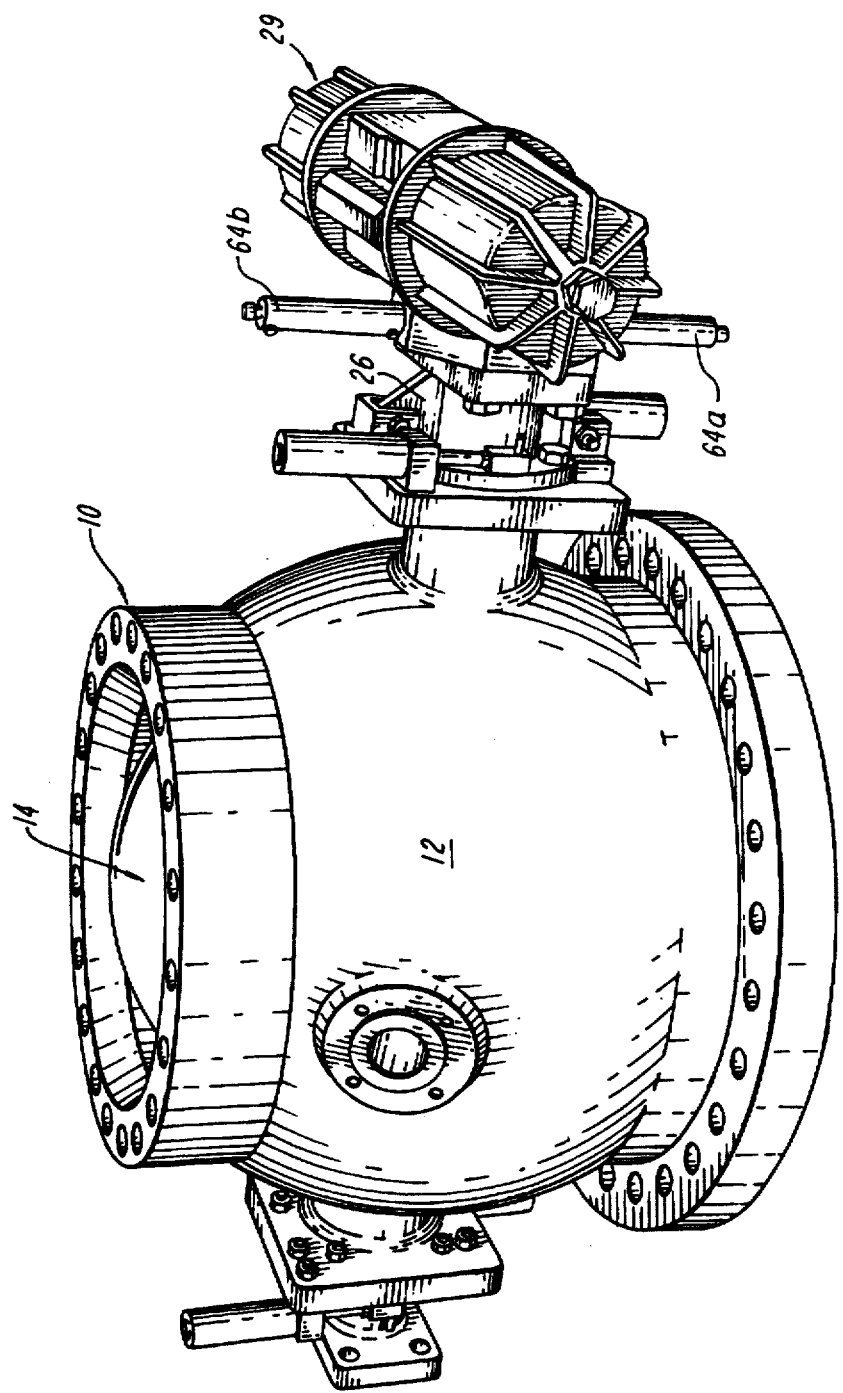
Figure 2:
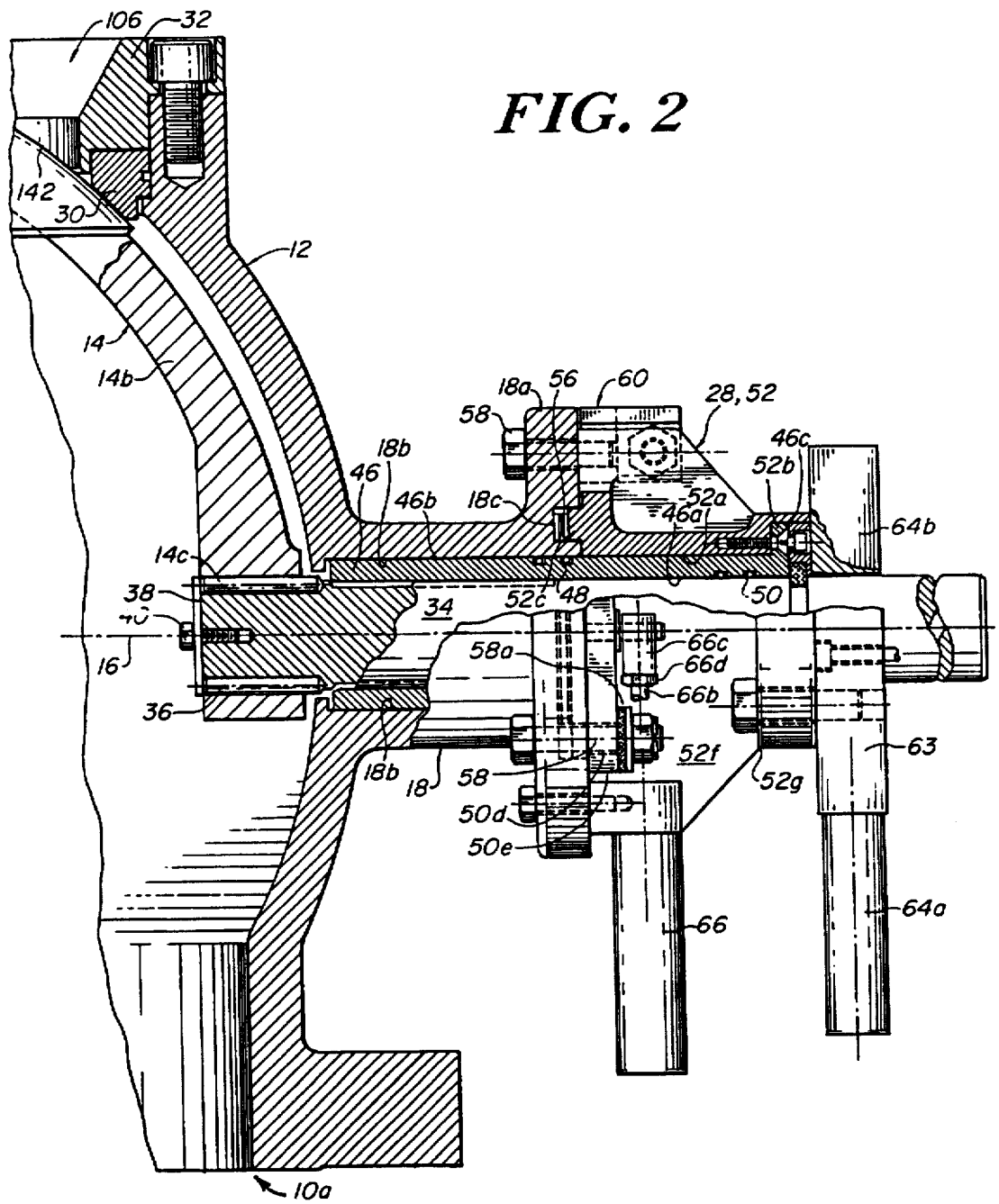
FIG. 2 is a fragmentary side elevation view, partly broken away and partly in section, of the ball valve assembly of FIGS. 1A and 1B.

FIGS. 1A and 1B show a front view and a perspective view, respectively, of a ball valve assembly 10 according to a preferred embodiment of the invention. FIG. 2 shows a fragmentary side elevation view, partly broken away and partly in section, of the ball valve assembly 10. With reference to FIGS. 1-2, the ball valve assembly 10 includes a ball valve body 12 having an inlet port or flanged opening 10a and an outlet port or flanged opening 10b. A spherical segment 14 mounts to a rotatable shaft (34, FIG. 2) so that the spherical segment 14 is rotatable about shaft axis and the shaft is mechanically coupled to an actuating motor assembly 29. Rotation of the shaft by ninety degrees, i.e. a quarter turn, moves the spherical segment 14 between an open position and a closed position, shown in FIGS. 1-3—where it blocks flow between the inlet port and the outlet port. It will be understood that the terms inlet and outlet are relative, and the functions of the ports may be reversed depending on flow direction or orientation of the valve in use. For example, it may be mounted on a tank as a cap valve, fill valve or drain valve, in which case, the valve may be viewed as constituting a single port.

With reference to FIGS. 1A and 1B, a valve 10 according to the invention has a body 12 that mounts a ball element 14. The ball element is rotatable about a normally horizontal shaft axis 16 (FIG. 2). Rotation of the ball element 14 by 90 degrees, i.e. by a quarter turn, moves it between an open position (FIG. 1B) and a closed position shown in FIG. 1A—where it blocks flow through a valve port 10b formed on the valve body 12.

The valve body 12 has diametrically opposed flanged mounting collars 18 and 20 that project axially outward from the generally spherical structure of the body 12 along the axis 16.

Each mounting collar is fitted with a sleeve type bearing that supports a shaft that carries the ball element 14. A hub assembly 26, 28 is secured to each bearing axially outward of the flange 18a, 20a of each mounting collar 18, 20. Each hub assembly can rotate through a preferably limited and adjustable small angle relative to the valve body 12 as discussed further below; the rotation is about an axis parallel to and selectively offset from the axis 16.

The illustrated valve 10 is symmetrical left-to-right about a vertical bisector, so that the structures on one side of the valve as shown in FIGS. 2 and 3 are applicable equally to the other side of the valve. However, the illustrated valve 10 has an interlock mechanism, described below with reference to interlock actuators 64a and 64b, only on one side, as FIGS. 1A and 1B show.

As also shown in FIGS. 1A and 1B, an actuating mechanism 29 is coupled to the outer end of either shaft for selectively and controllably rotating that shaft for drivingly moving the ball element 14 back and forth through a quarter turn, for selectively and controllably opening and closing the valve 10.

With reference to FIG. 2, the valve body 12 mounts a valve seat 30 at the valve output port 10b. The illustrated seat 30 has an annular ring-like shape and is clamped in place by a seat retainer 32 secured by threaded fasteners to the valve body 12.

Figure 4:
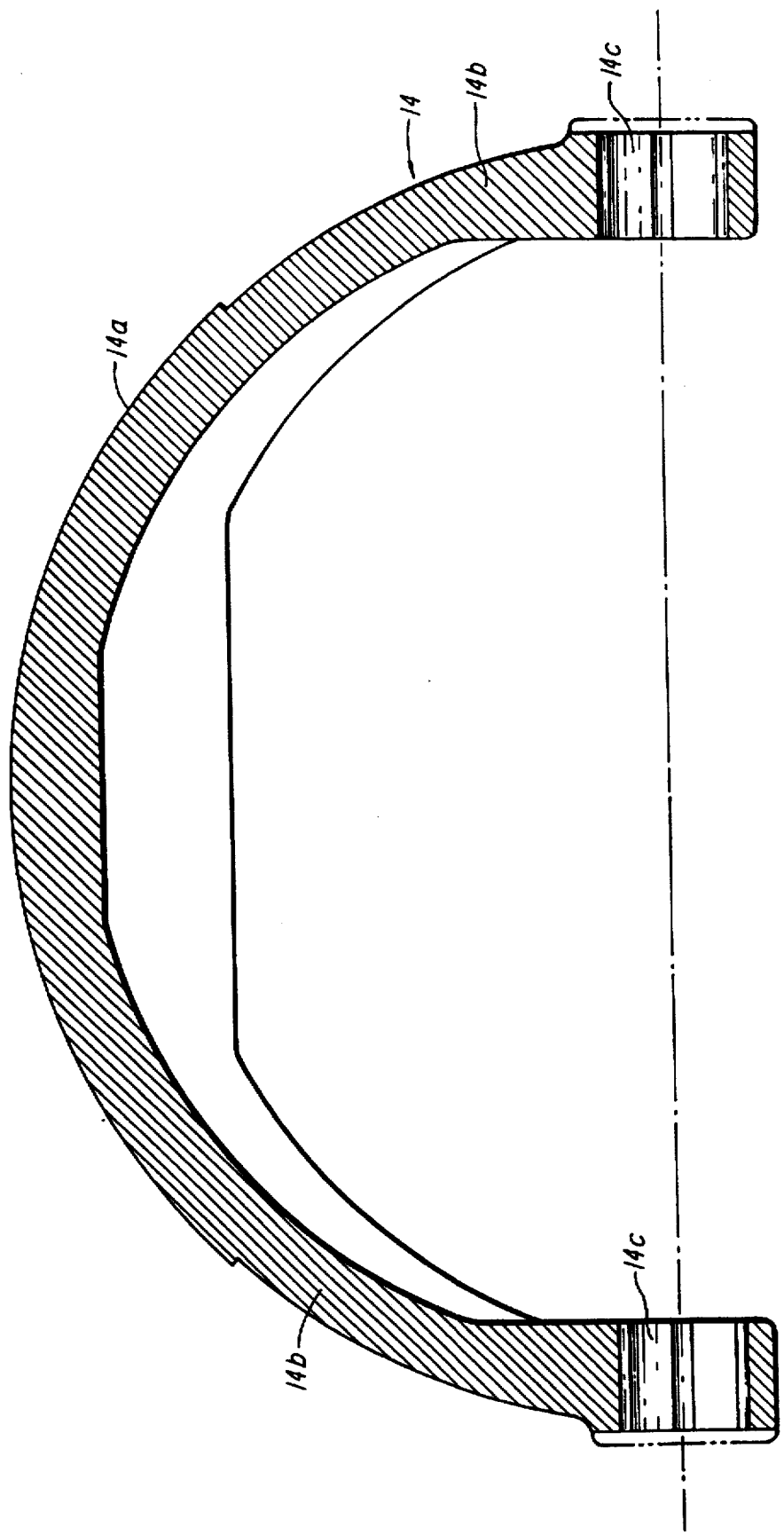
FIGS. 4 and 5 are, respectively, transverse sectional and elevation views of a spherical segment for the ball valve assembly of FIGS. 1-3.
Figure 5:
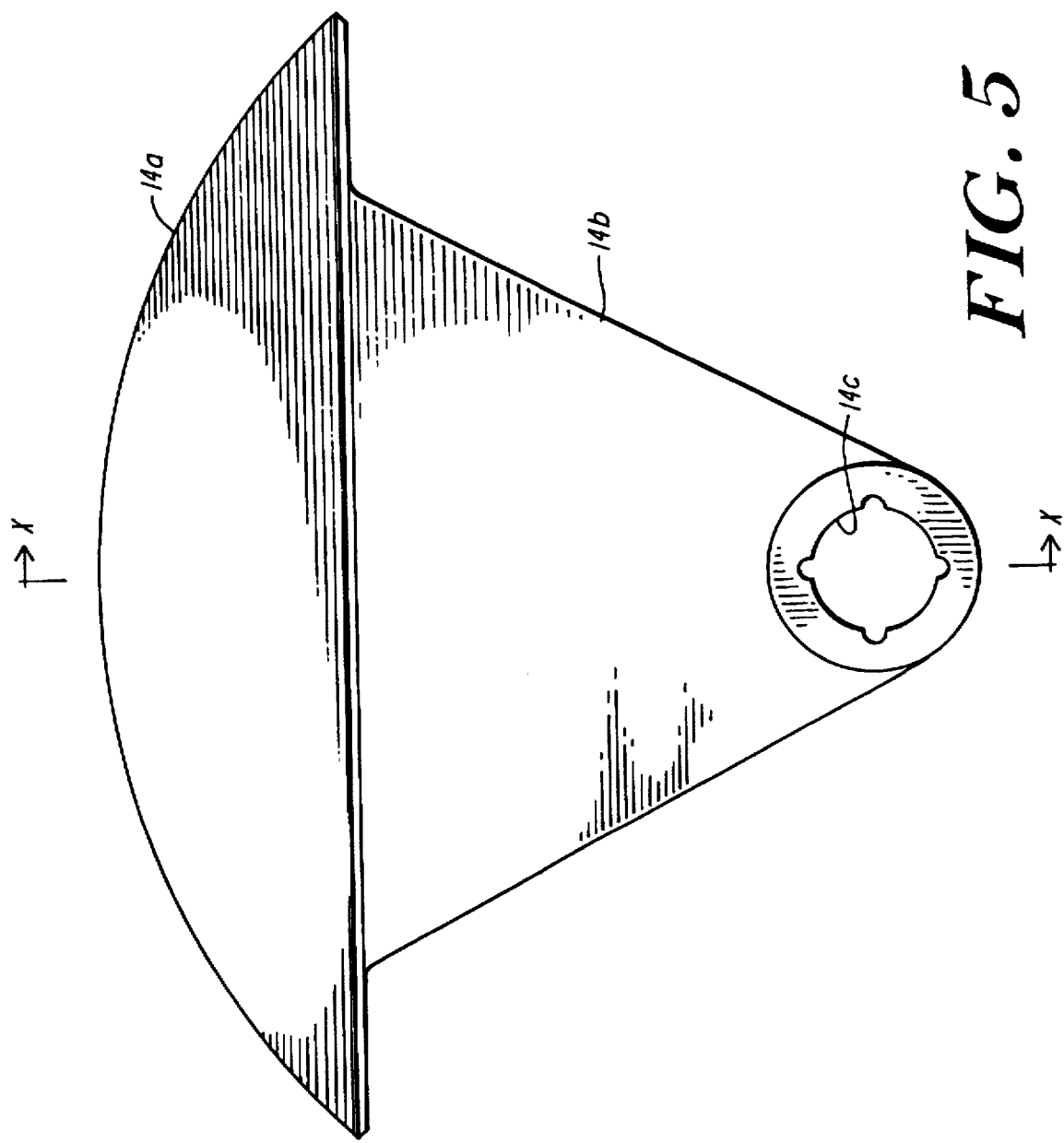

With reference to FIGS. 4 and 5, the ball element 14 of the valve 10 has a valving surface 14a that is a segment of a sphere and that is carried on a pair of arcuate legs 14b, 14b. The legs terminate at and form diametrically opposed shaft seats 14c, 14c, e.g., shaft-receiving yokes or bores.

Each shaft seat 14c, 14c on the ball segment is fastened to the inner end of one shaft segment 34, 34 for rotation therewith about the axis 16. The illustrated assembly of each shaft segment 34 to the ball segment 14 employs a set of dowel pins 36, illustrated with four pins in each set, preferably equally circumferentially spaced apart. Each pin 36 is seated in a cylindrical axially-extending hole (36a, FIG. 12) that is preferably centered on the cylindrical interface between the shaft segment 34 and the shaft seat 14c, as FIG. 2 shows.

Each set of pins 36 thus provides essentially multiple torque-transferring keys engaged between the shaft segment and the ball segment 14. The illustrated assembly further employs a shaft pin retaining plate 38, preferably shaped as a circular disk. A retaining screw 40 secures the plate to the innermost end of the shaft 34, and the plate has an outer periphery that extends over the axially inner-most end of each pin 36, to secure the pins in place.

With the foregoing assembly, the shaft 14c, 14c, shaft segments 34, shaft seats 14c and the spherical valve surface 14a of the ball segment 14 are all concentric with and rotate about the shaft axis 16.

Figure 3A:
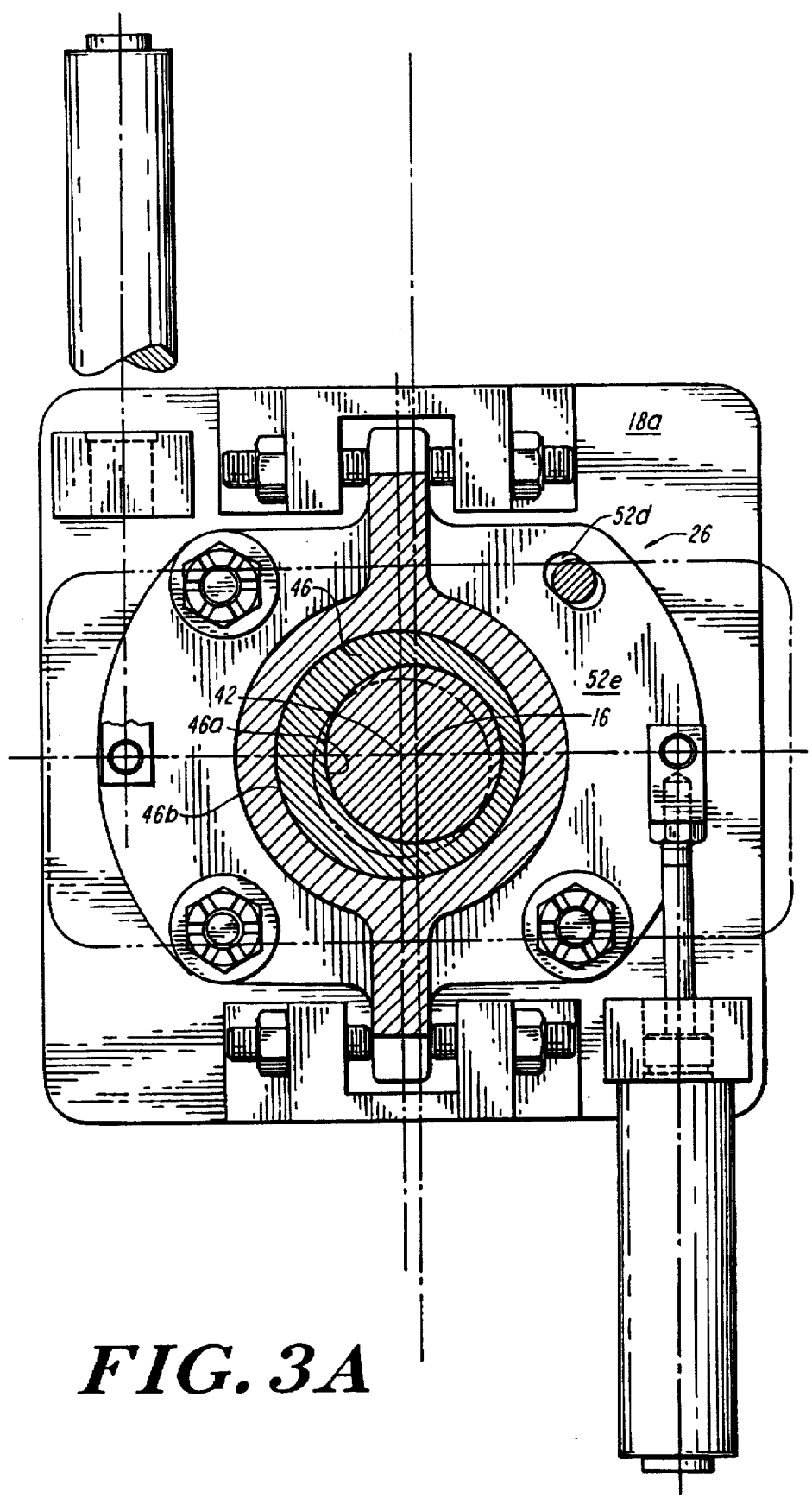
FIG. 3A is a fragmentary sectional view taken along section plane IIIA—IIIA in FIG. 1A.
Figure 3B:
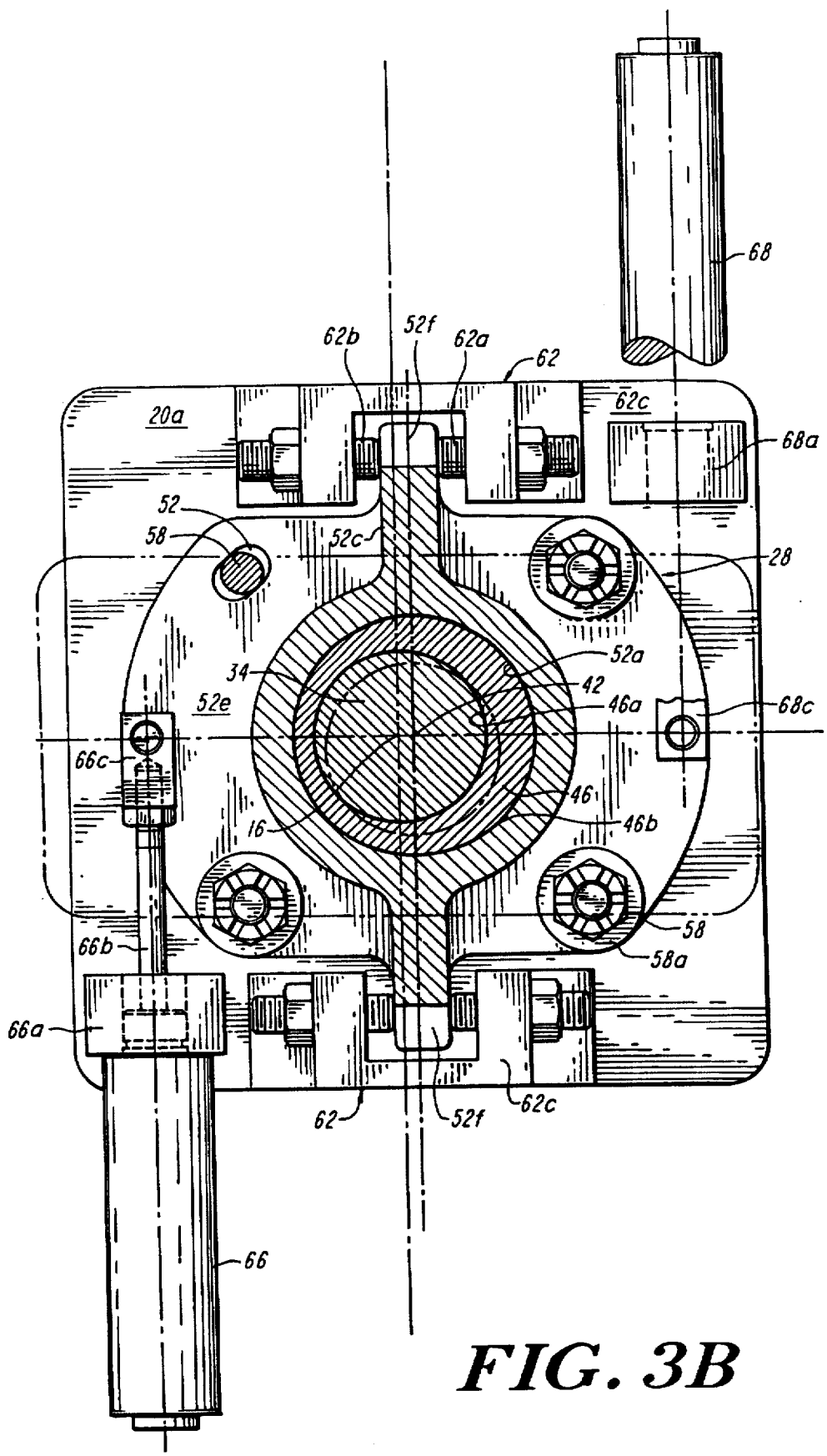
FIG. 3B is a fragmentary sectional view taken along section plane IIIB—IIIB in FIG. 1A.
Figure 7:
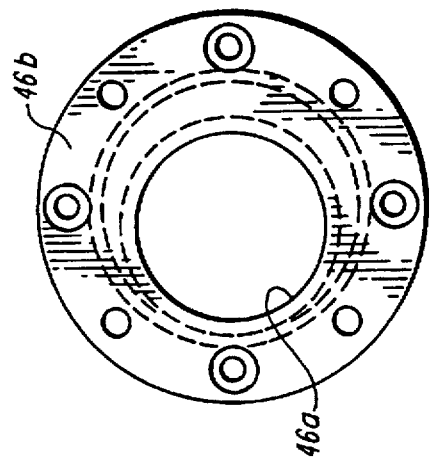
FIGS. 6 and 7 are, respectively, a sectional view and an end elevation view of a sleeve bearing for the ball valve assembly of FIGS. 1-3.
Figure 6:
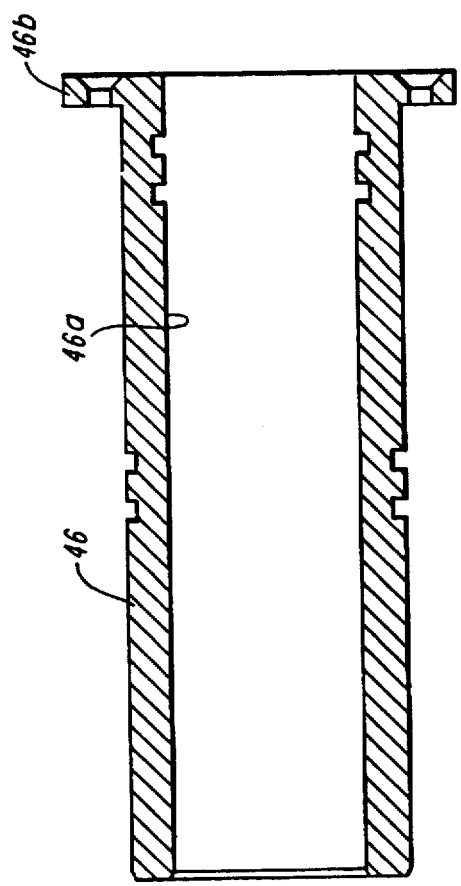

With further reference to FIGS. 2, 3A and 3B, the flanged mounting collar 18, which preferably is constructed identically to the flanged mounting collar 20 on the other side of the valve 10, has a cylindrical through passage 18b. This passage 18b is concentric with an axis 42 of the valve body 12, which is parallel to and offset from the shaft axis 16. Rotatably seated in the passage 18b is a sleeve bearing 46, a preferred construction of which is shown in FIGS. 6 and 7. The bearing outer surface is generally cylindrical and is circumferentially recessed with two axially spaced-apart grooves, each of which holds an O-ring 48, preferably together with an anti-extrusion ring as is conventional, for sealing engagement with the passage 18b. The bearing inner surface, which preferably has a hard chrome plating along the bearing length, that is within the mounting collar passage 18b, is also circumferentially recessed with two axially spaced-apart grooves, each of which holds a further O-ring 50, again preferably with an anti-extrusion ring, for sealing engagement with the shaft 34. The O-rings 50 are preferably axially adjacent the flanged outer end of the bearing 46 as appears in FIG. 2.

As shown in FIGS. 3A and 3B, in the assembled valve 10, outer surface 46b of bearing 46 is concentric with the body axis 42, and the bearing inner surface 46a, which holds the shaft 34, is concentric with the shaft axis 16. That is, the bore 46a of the sleeve bearing is offset from the center line of the bearing, while the outer surface is concentric thereto. Thus the bearing bore is eccentric relative to the bearing center line and hence relative to the body axis 42 defined by the housing of the assembled valve.

The hub assembly 26, shown in FIGS. 2, 3A and 3B, employs a shaft hub 52. By way of illustration, details of a preferred shaft hub are shown in FIGS. 8, 9 and 10. The hub assembly 28 on the other side of the valve 10 preferably employs an identical shaft hub; and thus the valve 10 as illustrated in FIGS. 1A and 1B is identically and symmetrically constructed on each end along the shaft axis 16.

The illustrated shaft hub 52 has a cylindrical inner passage 52a located concentrically with the body axis 42. The passage 52a receives and seats a portion of the length of the bearing 46, and an axially outermost flange 46c on the bearing is fastened to an outer annular face 52b of the hub for rotation therewith.

The hub 52 has, at the axial inner end, a mounting structure that engages the collar 18 or 20 of the valve body.

More particularly, the axially inner end of the hub 52, at the left in FIGS. 2 and 9, has an axially projecting annular lip 52c. The annular lip 52c seats in a mating groove 18c that is axially recessed in the axially outer face of the collar 18, as shown in FIG. 2. A roller bearing 56 is installed between the opposed faces of the lip 52c and of the groove 18c to facilitate rotation of the hub 52 relative to the valve body 12.

As further shown in FIGS. 2, 3A and 3B, the hub 52 is fastened to the mounting collar 18 or 20 of the valve body 12 by a set of threaded fasteners 58, illustrated as four in number. Each fastener 58 is seated in a hole through the collar flange 18a (respectively, 20a) and passes through on arcuately slotted passage 52d through a flange 52e located at the axially inner end of the hub 52. Each fastener 58 is secured with a threaded lock nut of conventional type, e.g., a castle nut, and preferably has a graphalloy or like bearing 58a between the nut and the hub flange. With this assemblage, the hub 52—and thereby the entire hub assembly with the bearing 46—is free to rotate, to a limited extent, about the body axis 42, relative to the mounting collar 18 and hence relative to the valve body 12. The roller bearing 56 and the fit of the sleeve bearing 46 within the mounting collar 18 facilitate this rotation, as does each graphalloy bearing 58a. The maximum amount of rotation is limited by the arcuate length of each slotted passage 52d relative to the diameter of the fasteners therethrough.

Moreover, the amount of this rotational movement of the hub assembly 26 relative to the valve body 12 is adjustable within that extreme limit by the engagement of radial tabs 52f on the shaft hub between a pair of opposed adjustable stops 62a and 62b carried on the mounting collar 18. In particular, the illustrated hub 52 has two tabs 52f, 52f extending radially outward at diametrically opposed locations. The end of each radial tab 52f is seated between a pair of opposed adjustable stops 62a and 62b. Each pair of illustrated stops is formed by a stop mechanism 62 having an adjustable mount 62c secured on the mounting collar flange 18a, 20a. The stop mount carries a pair of opposed adjusting studs, each fitted with a lock nut and threadably engaged in the mounting bracket 62c, and the opposed ends of which form the stops 62a and 62b.

A further feature of the valve structure of the invention is that each hub assembly is rotationally biased relative to the valve body 12. With reference to FIGS. 2, 3A and 3B, the bias is for rotation about the body axis 42. It is in a direction that, by virtue of the eccentricity of the shaft axis 16 provided by each bearing 46, moves the shaft axis to enhance the compressive sealing engagement of the ball segment 14 against the valve seat 30. That is, it pushes the shaft upward, in the overhead-sphere embodiment illustrated in FIGS. 1A and 1B.

More particularly, the illustrated valve structure provides this rotational bias with resilient acting, spring-like elements engaged between the mounting collar 18 and the hub assembly 26, and—on the other axial side of the valve—between the mounting collar 20 and the hub assembly 28. As shown in FIGS. 2, 3A and 3B, the illustrated valve 12 provides these resilient elements by providing a pair of hub-rotating actuator cylinders 66 and 68, each mounted by a mounting block 66a and 68a, respectively, to the collar flange 18a or 20a. Each cylinder 66, 68 has a piston 66b, 68b, respectively, the end of which is secured to the hub flange 52e, with adjustable positioning, by way of a clevis 66c, 68c and a lock nut 66d threaded on the piston. The driving force in each cylinder-piston assembly can be a spring. Alternatives include active force as provided pneumatically or hydraulically.

This assembly of each actuator cylinder 66, 68 and piston 66b, 68b is oriented to apply a torque to the hub 52 relative to the mounting collar 18 and hence relative to the valve body. Both torques act in the same direction, namely to rotate the hub assembly to lift the shaft axis 16 upward, or more particularly, displace the shaft axis 16 in the direction that increases compressive engagement between the valve ball segment 14, and the valve seat 30 when closed. Thus in FIG. 3B the piston 66b pushes upwardly and piston 68b (not shown) pushes downwardly to rotate the hub 52 clockwise, while the pistons of FIG. 3A are reversed in position to rotate the hub at the opposite end of the shaft counter-clockwise, in each case providing an upward displacement and upward force on the shaft-carrying bore 46a.

It is understood that each cylinder-piston actuator acts with a mechanical advantage. This mechanical advantage is related to the radial distance between where the actuator applies force to the hub flange 52e and the rotation axis of the hub (that is, to the torque applied by pistons 66, 68) and is further related to the eccentricity the bearing 46 provides between the shaft axis 16 and the body axis 42 (that is, to the camming pressure due to rotation of the eccentric bushings 46).

It will be recalled that a shaft drive motor actuator mechanism 29 of FIG. 1A is mounted on the hub assembly to turn the shaft 34. With this construction, driven rotation of the valve shaft 34 by the actuator mechanism 29 of FIG. 1 transmits a counter-torque to the hub assembly on which it is mounted and causes the hub assembly 26, including the shaft hub 52 and the sleeve bearing 46, to rotate in the opposite direction. The driven rotation of the valve shaft is, as discussed above, a quarter turn, i.e. 90 degrees, to switch the position of the valve ball segment 14 between the open position and the closed position. The induced counter rotation of the hub assembly, on the other hand, is limited to only a few degrees, as adjustably controlled by the adjustable stops 62a and 62b acting on the each radial tab 52f of the shaft hub 52.

More particularly, in one embodiment, clockwise driven rotation of the shaft 34 by the drive motor 29 to move the ball segment 14 to the closed position causes the hub assembly to rotate counterclockwise. The eccentrically bored sleeve bearing 46 is rotationally fixed in the shaft hub 52 so that the eccentricity of the shaft axis 16 relative to the hub assembly results in the shaft being moved or displaced in a circumferential direction relative to the body axis 42. The direction of this circumferential displacement of the shaft axis 16 moves the valving surface 14a of the ball segment 14 further into compressive engagement with the valve seat 30, when the valve is closed. That is, a clockwise valve-closing driven rotation of the valve shaft 34 produces counterclockwise rotation of the hub assembly 26 in a manner to lift the shaft and the axis 16, so that when the valve is in the vertically upright position shown in FIG. 1A, this lifting action presses the ball segment 14 more tightly against the valve seat 30. This action is desired. It produces a tighter valve shut-off, and exerts a pressure and wiping action of the valving surface 14a relative to the valve seat 30 which aids in removing debris and other particulates from the valving surface as the valve is closed.

Conversely, when the actuator mechanism 29 in this illustrative example drives the valve shaft 34 counterclockwise for opening the valve 10, the hub assembly 26 is driven clockwise. That clockwise rotation of the hub assembly 26, through a limited angle, moves the hub assembly downward relative to the valve body 12, by virtue of the eccentricity provided by the sleeve bearing 46. Consequently, the valve shaft 34, which carries the ball segment 14, is displaced or offset downwardly, to relieve the pressure engagement of the valving surface 14a against the valve seat 30 as the large spherical surface starts to rotate.

The valve 10 of the invention as described above thus has an active bearing mechanism that provides selected and controllable movement, namely translation, of the rotation axis of the ball segment relative to the valve seal. The valve accordingly is self adjusting with regard to wear, and it automatically compensates for differential thermal expansion and contraction. Further, the valve shaft is constantly resiliently biased to move in a direction that engages the ball segment against the seat, during valve closure conditions, and relieves seating pressure as the valve starts to open.

Moreover, since the rotation axis 16 shifts to seat the spherical segment directly against the seat 30 (FIG. 2), a valve according to the invention operates with a ball valve ratio, wherein the pressure of the fluid or other material being controlled acts against a large surface of the ball segment, to increase the seating pressure applied to the smaller area of the valve seat.

Figure 11:
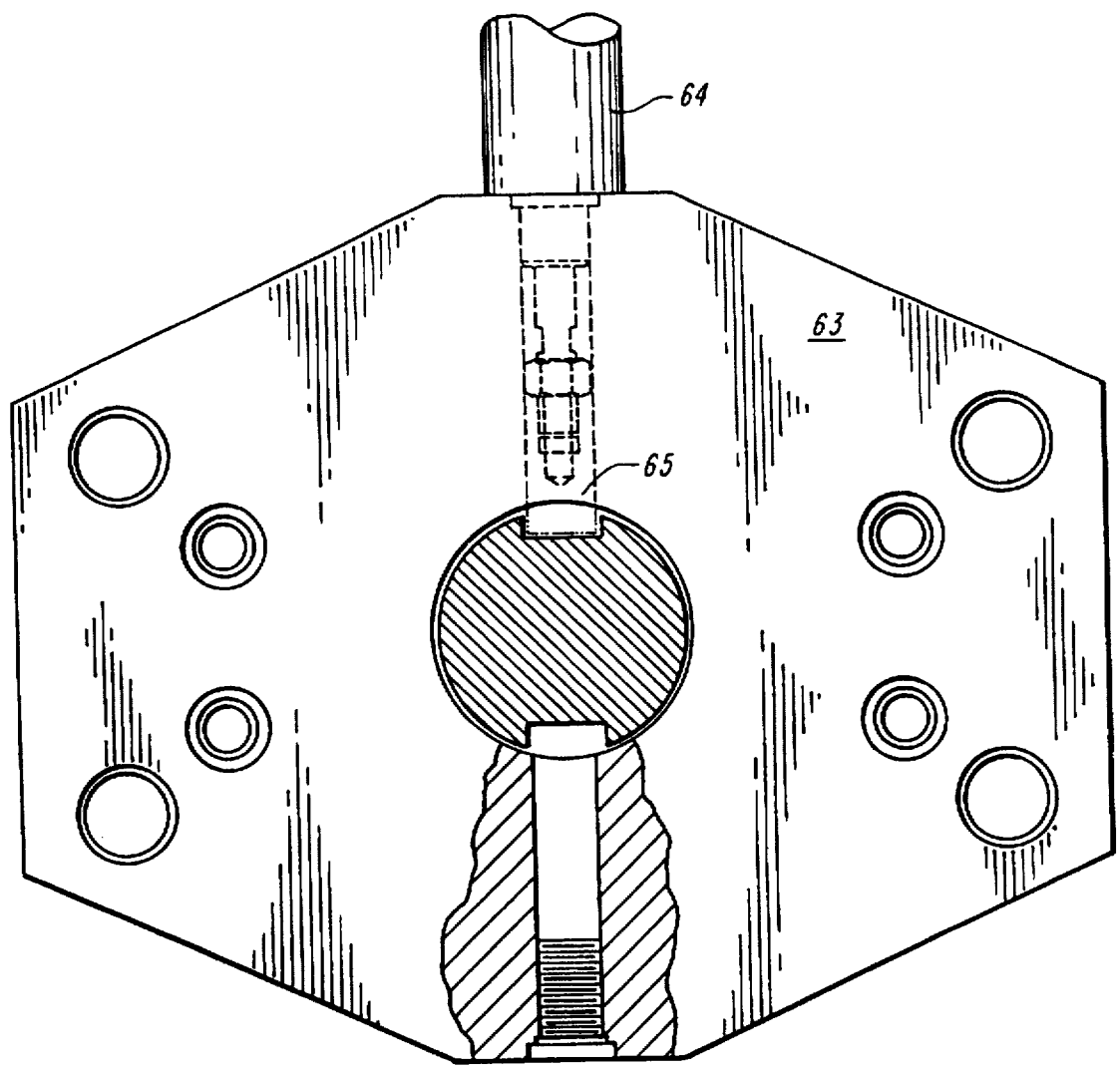
FIG. 11 is a fragmentary end elevation view depicting elements for locking the ball valve assembly of FIGS. 1-3 in a closed position.

With further reference to FIGS. 1A, 1B and 2 and to FIG. 11, the illustrated valve has a pair of interlock actuators 64a and 64b, illustrated as pneumatic pistons, that prevent inadvertent switching of the ball valve segment 14. The illustrated actuators 64a and 64b are amounted on an axially outer flange 52g of the shaft hub, by way of threaded fasteners as shown. Each actuator is linked to move an interlock pin 65 selectively relative to rotationally-interfering engagement with the valve shaft 34. In one embodiment, each interlock pin is spring biased to enter a hole extending in the valve shaft transversely to the shaft axis and thereby prevent shaft rotation. Each shaft hole is aligned with a pin only when the valve is in a selected position, typically the closed position. The interlock actuator is coupled to retract that pin from the shaft and thereby allow the shaft to rotate.

The two interlock actuators 64a and 64b are essentially redundant and each performs essentially the same function. The valve 10 employs two such actuators for enhanced safety. Moreover, the two interlock actuators can be arranged logically in series with other interlock elements, such as position switches and/or limit switches, in a logic circuit with pneumatic, electrical or other drive units, to disable operation of the valve except when a selected set of safety conditions is satisfied.

It will thus be seen that by mounting the shaft for spring biased rotation of an offset carrier sleeve, a mechanism is provided which both alleviates wear on the sealing faces and allows the ball segment to self adjust in use to always maintain sealing contact. Since the ball is precisely positioned against the valve seat, high pressure exerted on the ball is not resisted by bending deflection of the shaft 34, but rather operates directly to increase sealing pressure against the valve seat. Furthermore, by providing a spring load supplement by selectively actuated piston assemblies 66, 68 to establish the rotational bias on the hub, the bias may be relieved, simply by relieving the piston force so the hub may be rotated to lower the shaft axis with diminished loading on the valve seat prior to rotation. It will be appreciated that in general it is only necessary to provide a drive motor on one end of the valve shaft 34, so that the counter-torque hub rotation occurs only on one hub assembly 26 (as shown) or 28. However, by providng synchronized drive assemblies on both collars 18,20 the hub rotation bias effect may be applied more symmetrically. Similarly, by substituting double-acting or bidirectional fluid-driven pistons for the biasing pistons 66b, 68b, the pistons may be actively operated to raise or lower the shaft as the valve is closed or opened.

It will be appreciated that the ball valve of the present invention may be a massive structure, with ports a half meter or more in diameter, and valve seats 30 having an area of tens to a hundred square centimeters, and a sphere segment 14 that occludes a port with an area of many hundreds of square centimeters. Moreover, the valve may operate, for example, as a cap valve in a digester or high-pressure process chamber, where the inlet fluid includes non-liquid e.g. solid, fibrous or ash-laden aggregate process materials which may abrade or erode the valve seating faces. For such process materials, the unique suspension which provides a translational shift of the valve shaft to increase loading as the valve seats and decrease loading as the valve unseats—all result in a capability for enhanced wear and prolonged self-adjustment characteristics.

By way of numerical examples, for a ball valve sized to operate as the cap valve of a pulp industry digester tank, the shaft or split shaft assembly 34 may have a shaft diameter of 2–2½ inches, and the sleeve bearing 46 may have an eccentricity "e" of approximately 0.030 inches, allowing the shaft axis centerline to be offset by that amount. The clevis pins 28 for attachment of the spring and/or piston bias may be situated on the hub 52 at approximately five inches from the axis, resulting in a mechanical advantage of over 150:1 for converting the rotational bias of the hub 52 to a translational force that re-positions the shaft axis. As noted above, since the drive motor housing is mounted on the hub assembly, driving the shaft results in a reactive counter-torque on the hub, so that hub rotation may be configured to apply this enhanced force to increase loading for static valve closure, or to decrease loading during movement or initial seating of the valve. The direction of the dynamic counter-torque effect is determined by the direction of eccentricity of the sleeve 46, in relation to the valve rotation.

It will be further understood that the locking pin assemblies 64c, 64c will in general have active locking elements such as hardened steel pins or bars which are non-deformable, and are not prone to shear or breakage. The motive assembly 29 will in general comprise a gear reduction assembly generally including torque-enhancing and direction-changing elements, such as a worm or pinion drive unit for converting the motor drive to a suitable slow rotational drive motion. The actuator is preferably coupled to the shaft 34 by a torque-limited coupling, such as a clutch or friction coupling with a fixed slip torque, or such as a keyed shaft with a key that shears at a fixed shear torque. In either case the slip or shear torque is set below the shear point of locking pins 64a, 64b. This assures that the motor will not override the safety lock or impair the lock mechanism, and conversely, the motor itself will not be damaged by operating against an immovable load.

As described above, the shaft 34 of the preferred embodiment is a split shaft, comprised of left and right end stubs, each of which is secured rigidly to one of the arms 14b of the segment (FIG. 4), and both of which are aligned along a common shaft axis 16. In this case the left and right eccentric bushings or bearing sleeves 46 allow a degree of control over fine positioning of the axis 16 and automatically maintain the shaft axis in a position to seat the valve segment properly. As noted above, the counter-torque applied to the hub 52 and sleeve 46 also softens the seat contact as the valve segment rotates into and out of engagement, while allowing a high bias force to develop in the static closed position.

Figure 12:
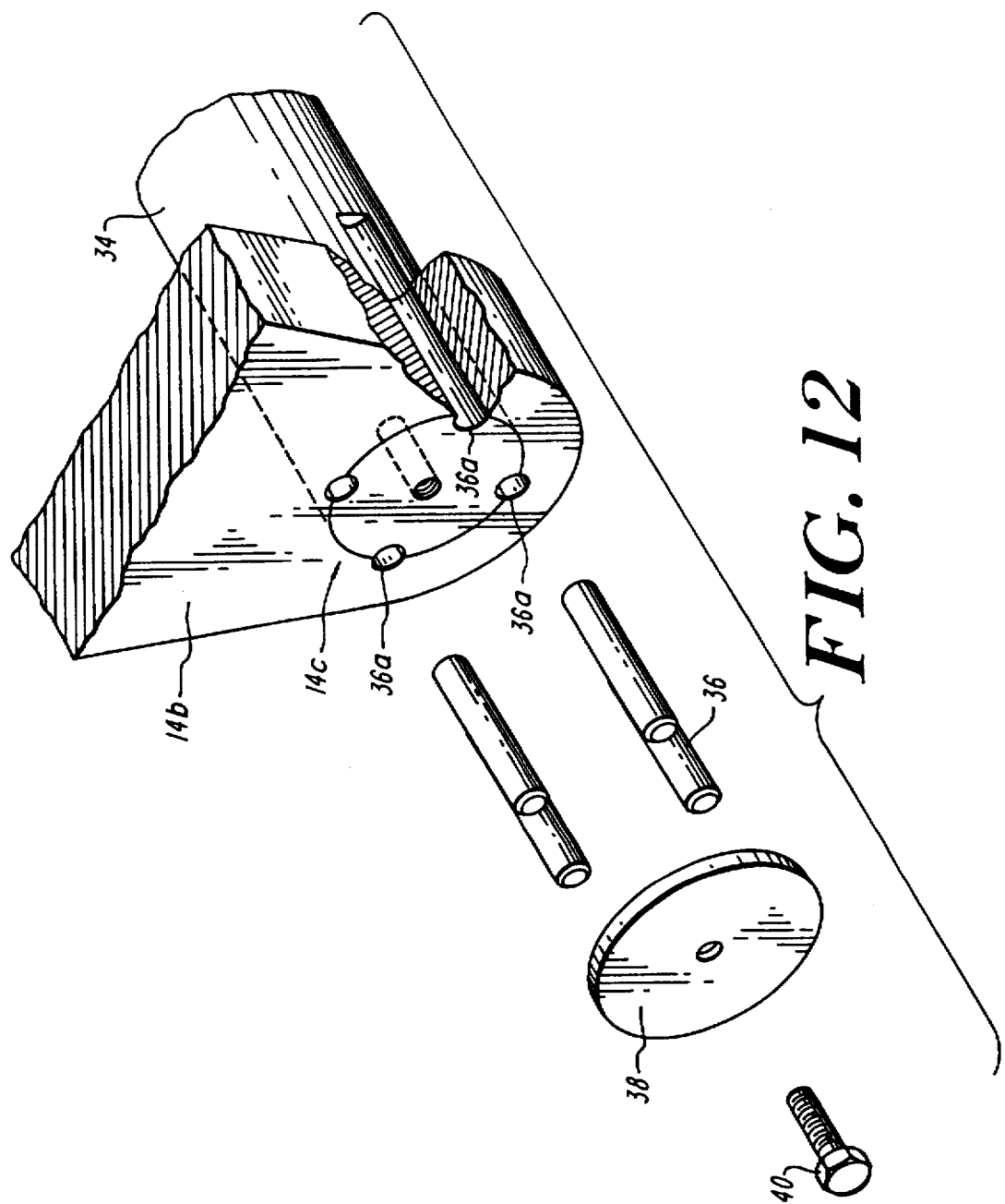
FIG. 12 is a partial cut-away view illustrating a preferred mounting of ball segment on its actuation shaft.

FIG. 12 is an exploded perspective view, partially cut away, of the preferred method of mounting the ball segment 14 on shaft 34. As shown therein the shaft 34 fits tightly within a cylindrical bore (not numbered) formed through the arms 14b of the ball assembly. A plurality of dowel-receiving bores 14d are drilled to form mating precision hemicircular keyways about the circumference of the shaft and the surrounding arms, and these are filled with hardened steel dowels 36. The dowel pins 36 are retained by a simple circular retaining plate 38 centrally bolted to shaft 34 by bolt 40. This provides an extremely robust construction for locking the spherical valve body on the shaft.

In this way, the invention attains the objects set forth above and provides a ball valve assembly, which automatically adjusts an eccentric offset between a shaft axis, about which a spherical segment radially extends, and a valve body axis. This eccentricity operates to maintain or enhance the seal between the spherical segment and a valve seat. The invention further provides a ball valve assembly which exploits a ball valve ratio to further enhance the seal between the spherical segment and the valve seat, allowing it to function securely as a cap valve on a high pressure process vessel or similar application.

It is accordingly intended that all matter contained in the above description be interpreted as illustrative rather than in a limiting sense. The invention being thus disclosed and described by reference to an illustrative embodiment, variations and modifications within the scope of the invention will occur to those skilled in the art. It is intended that the following claims cover all of the generic and specific features of the invention as described herein, and all statements of the scope of the invention which, as a matter of language, might be understood to fall therebetween or be comprehended therein.

Having described the invention, what is claimed as new and secured by Letters Patent is:

1. A ball valve assembly comprising:

a ball valve body having a port for fluid flow therethrough, and a body through passage located concentrically about a body axis, a shaft assembly mounted through said through passage for rotation about a shaft axis, a sleeve bearing rotatably mounting said shaft assembly in said through passage, said sleeve bearing having a substantially cylindrical inner surface and a substantially cylindrical outer surface, wherein a portion of said cylindrical outer surface fits concentrically within said through passage, and said cylindrical inner surface concentrically fits around a portion of said shaft assembly, said inner surface being eccentric with respect to said outer surface so that said shaft axis is parallel to but offset from said body axis, a spherical segment for closing said port, the spherical segment being mounted to said shaft assembly and radially extending from said shaft axis within said ball valve body, said spherical segment including a sealing face for sealing engagement with said port upon rotation of said shaft assembly through a predefined angle, and adjustment means for automatically adjusting said offset between said body axis and said shaft axis parallel to the body axis so as to enhance said sealing engagement between said spherical segment and said port, said adjustment means including a biasing assembly for exerting a rotational bias on the sleeve bearing to thereby automatically adjust the magnitude of said offset during rotation.

2. A ball valve assembly according to claim 1 wherein said rotational bias is substantially constant.

3. A ball valve assembly according to claim 1 wherein said rotational bias is selectively applied.

4. A ball valve assembly according to claim 1 further comprising limiting means for setting a range in which said bearing means is movable in response to said rotational bias.

5. A ball valve assembly according to claim 1 further comprising locking means for locking said spherical segment in said sealing engagement with said port.

6. A ball valve assembly according to claim 5 wherein said locking means comprises an interlock pin for selectively inhibiting rotation of said shaft assembly.

7. A ball valve assembly according to claim 6 further comprising a drive element for rotating said shaft assembly, and coupled to said shaft assembly by way of a shear element, wherein said shear element decouples said drive element from said shaft assembly at a torque below a failure torque of said interlock pin.

8. A ball valve assembly according to claim 1 further comprising sealing means for forming a fluid sealing barrier between said cylindrical inner surface of said sleeve bearing and said shaft assembly.

9. A ball valve assembly according to claim 1 further comprising sealing means for forming a fluid sealing barrier between said cylindrical outer surface of said sleeve bearing and said through passage of said ball valve body.

10. A ball valve assembly according to claim 1 wherein said cylindrical inner surface of said sleeve bearing includes a friction reducing coating for facilitating rotation of said shaft assembly within said sleeve bearing.

11. A ball valve assembly according to claim 1 further comprising a mounting assembly for mounting said spherical segment to said shaft, said mounting assembly including a mounting member having a first end for coupling to said spherical segment and a second end distal from said first end for coupling to a terminal end of said shaft, said second end having a substantially cylindrical through aperture for receiving said terminal end of said shaft, said mounting assembly further including fastening means for fastening said terminal end of said shaft in said cylindrical through aperture of said mounting member.

12. A ball valve assembly according to claim 11 wherein said fastening means comprises, a plurality of axially extending apertures formed in said terminal end of said shaft and in said second end of said mounting member, said apertures being circumferentially spaced apart at an interface between said terminal end of said shaft and said cylindrical through aperture of said mounting member, a plurality of dowel pins, each dowel pin being seated in one of said axially extending apertures located at said interface between said shaft and said cylindrical through aperture of said mounting member to inhibit said shaft from rotating within said cylindrical through aperture, and a retaining plate fastened to at least one of said mounting member and said terminal end of said shaft for retaining said dowel pins.

13. A ball valve assembly according to claim 1, further comprising a drive mechanism coupled between said sleeve bearing and said shaft to drive the shaft while simultaneously applying a counter-torque to the sleeve bearing.

14. A ball valve assembly according to claim 1, further comprising means for locking said shaft in a fixed position and means for limiting torque applied by said drive mechanism when the shaft is locked.

15. A ball valve assembly comprising a ball valve body having a port for fluid flow therethrough and a body through passage located concentrically about a body axis, a shaft assembly bearing means for rotatably mounting said shaft assembly in said through passage, and including a sleeve bearing having a substantially cylindrical inner surface and a substantially cylindrical outer surface, wherein a portion of said cylindrical outer surface fits concentrically within said through passage, and said cylindrical inner surface concentrically fits around a portion of said shaft assembly such that the shaft assembly is mounted through said through passage for rotation about a shaft axis which is parallel to but offset from said body axis, a spherical segment mounted to said shaft assembly and radially extending from said shaft axis within said ball valve body, said spherical segment including a sealing face for sealing engagement with said port upon rotation of said shaft assembly through a predefined angle, and adjustment means for automatically adjusting said offset between said body axis and said shaft axis to enhance said sealing engagement between said spherical segment and said port wherein said sleeve bearing includes an external portion extending outward from said valve body, and said ball valve assembly further comprises a hub assembly having a substantially cylindrical through passage for concentrically fitting around said external portion of said sleeve bearing, and having fastening means for rotationally fixing said hub assembly with respect to said sleeve bearing and mounting means for mounting said hub assembly for adjustable rotation with respect to said valve body.

16. A ball valve assembly according to claim 15 wherein said external portion of said sleeve bearing includes a radially extending mounting flange secured by said fastening means.

17. A ball valve assembly according to claim 15 wherein said adjustment means includes biasing means for exerting a rotational bias on said hub assembly with respect to said valve body to rotate said hub assembly together with said sleeve bearing and automatically adjust said offset between said body axis and said shaft axis.

18. A ball valve assembly according to claim 17 further comprising a mounting collar radially disposed about said through passage and extending outwardly from said valve body along said body axis, said mounting collar having a radially extending flange with a first plurality of mounting apertures, wherein said mounting means of said hub assembly has a second plurality of mounting apertures, each of said first plurality of mounting apertures aligning with one of said second plurality of mounting apertures to form an aligned pair, and said ball valve assembly further comprising fasteners for coupling through each said aligned pair to secure said hub assembly to said mounting collar.

19. A ball valve assembly according to claim 18 wherein said second plurality of mounting apertures are slots which permit said hub assembly to rotate about said body axis through a limited arc.

20. A ball valve assembly according to claim 19 further comprising a rotational bearing race between said hub assembly and said mounting collar for rotation of said hub assembly in relation to said mounting collar.

21. A ball valve assembly according to claim 18 wherein said mounting collar has one or more radially disposed slots, each for receiving a corresponding radial tab located on said hub assembly, wherein said slots and said tabs are sized to enable said hub assembly to rotate about said body axis relative to said mounting collar, within limits set by said slotted mounting apertures of said hub assembly.

22. A ball valve assembly according to 21 wherein said mounting collar further comprises adjustable stops located within each of said radially disposed slots for selectively engaging said tabs on said hub assembly to limit arc through which said hub assembly can rotate.

23. A ball valve assembly according to claim 17 wherein said rotational bias is substantially constant.

24. A ball valve assembly according to claim 17 wherein said rotational bias is selectively applied.

25. A ball valve assembly according to claim 17 further comprising limiting means for setting a rotational range in which said hub assembly can rotate in response to said biasing means.

26. A ball valve assembly according to claim 17 wherein said biasing means comprises a first resilient element mechanically coupling said valve body and said hub assembly and including means for applying a tangential force on said hub assembly at a first location to exert said rotational bias on said hub assembly.

27. A ball valve assembly according to claim 26 wherein said biasing means comprises a second resilient element mechanically coupling said valve body and said hub assembly and including means for applying a tangential force on said hub assembly at a second location to exert said rotational bias on said hub assembly.

28. A ball valve assembly according to claim 27 wherein said first location and said second location are substantially diametrically opposed around a periphery of said hub assembly.

29. A ball valve assembly according to claim 26 wherein said first resilient element includes a shaft element and a piston element, wherein said shaft element mechanically couples to said hub assembly at said first location, said piston element mechanically couples to said valve body and said piston element includes actuator means for exerting an axially directed force on said shaft element.

30. A ball valve assembly according to claim 29 wherein said actuator means comprises a spring.

31. A ball valve assembly according to claim 29 wherein said actuator means comprises a hydraulically actuated cylinder.

32. A ball valve assembly according to claim 29 wherein said actuator means comprises a pneumatically actuated cylinder.

33. A ball valve assembly comprising:

a ball valve body having a port for fluid passage therethrough, and first and second mounting collars, distally located along a body axis, each of said first and second mounting collars extending axially outward from said ball valve body and having a through passage, wherein said through passage is concentric with said body axis;

a first shaft rotatably mounted through said first mounting aperture along a shaft axis, parallel to but offset from said body axis;

a second shaft rotatably mounted through said second mounting aperture along said shaft axis;

a spherical segment mounted to said first and second shafts and radially extending from said shaft axis within said ball valve body, and including means for sealing engagement with said port upon rotation of said shaft through a predefined angle;

a first sleeve bearing, having a substantially cylindrical inner surface and a substantially cylindrical outer surface, wherein a portion of said cylindrical outer surface of said first sleeve bearing fits concentrically within said through passage of said first mounting collar, and said cylindrical inner surface of said first sleeve bearing fits concentrically around a portion of said first shaft extending through said through passage of said first mounting collar;

a second sleeve bearing, having a substantially cylindrical inner surface and a substantially cylindrical outer surface, wherein a portion of said cylindrical outer surface of said second sleeve bearing fits concentrically within said through passage of said second mounting collar and said cylindrical inner surface of said second sleeve bearing fits concentrically around a portion of said second shaft extending through said through passage of said second mounting collar;

wherein said cylindrical outer surfaces of said first and second sleeve bearings are concentric with said body axis, said cylindrical inner surfaces of said first and second sleeve bearings are concentric with said shaft axis, and said first and said second sleeve bearings include portions extending radially outward from said valve body;

a first hub assembly rotationally adjustably mounted to said first mounting collar, having a through passage concentric with said body axis for seating said portion of said first sleeve bearing extending axially outward from said valve body, and including means for rotationally fixing said first hub assembly to said first sleeve bearing;

a first biasing means for rotationally biasing said first hub assembly with respect to said first mounting collar;

a second hub assembly rotationally adjustably mounted to said second mounting collar, having a through passage concentric with said body axis for seating said portion of said second sleeve bearing extending axially outward from said valve body, and including means for rotationally fixing said second hub assembly to said second sleeve bearing;

a second biasing means for rotationally biasing said second hub assembly with respect to said second mounting collar;

wherein said first and said second biasing means rotationally bias said first and second hub assemblies in a direction which automatically adjusts said offset between said body axis and said shaft axis to enhance said sealing engagement between said spherical segment and said port.

* * * * *